Aug. 25, 1942.　　　L. J. JAGOW　　　2,294,303

HOLE FINDER AND GUIDE

Filed Jan. 13, 1941

INVENTOR
LEROY J. JAGOW
BY
ATTORNEY

Patented Aug. 25, 1942

2,294,303

UNITED STATES PATENT OFFICE 2,294,303

HOLE FINDER AND GUIDE

Leroy J. Jagow, Buffalo, N. Y., assignor to Curtiss-Wright Corporation, a corporation of Delaware Application January 13, 1941, Serial No. 374,256

4 Claims. (Cl. 77—55)

This invention relates to accessories for drilling machines and has for its primary object the provision of a device which may be used in connection with small and slender drills to save the drills from breakage. A further object of the invention is to provide a relatively sturdy drill pilot forming a part of the drilling machine, such pilot being so arranged as to serve, with a drilling template of relatively soft material, as a drill jig which will not be subject to abrasion and wear.

In drilling operations it is well known of course to provide drilling jigs within which work to be drilled is secured, such jigs being provided with a plurality of hardened bushings through which a drill passes to locate the drill and hole properly. This procedure is perfectly satisfactory with machine parts but becomes expensive when a large number of holes are to be drilled in sheet metal since, if a template with hardened bushings be used in such an environment, a great number of bushings would be necessary and the template or drilling jig would become unnecessarily expensive. Furthermore, a template or jig provided with hardened bushings when used in connection with small drills, serves no useful purpose in minimizing breakage of the drills. In the present invention, I contemplate using a template having a plurality of locating holes whose diameter is somewhat larger than the diameter of the hole to be formed, this template being of relatively soft material and being disposed in fixed relation over one or a stack of sheet metal components which are to be drilled. On the drilling machine is mounted a device which is provided with a slidable sleeve concentric with the drilling axis, the sleeve carrying a hardened bushing fitted with running clearance to the drill and exteriorly shaped to engage the locating holes in the template. The sleeve is mounted for sliding and relative rotation with respect to the drill so that in use, the bushing may first be engaged with a template hole and the drill may then be plunged through the bushing and into the work sheets.

From the above matter and also from the detailed description following, the objects of the invention will be fully appreciated and for a more complete understanding of the details of the invention reference may be made to the drawing, in which.

Figure 1:
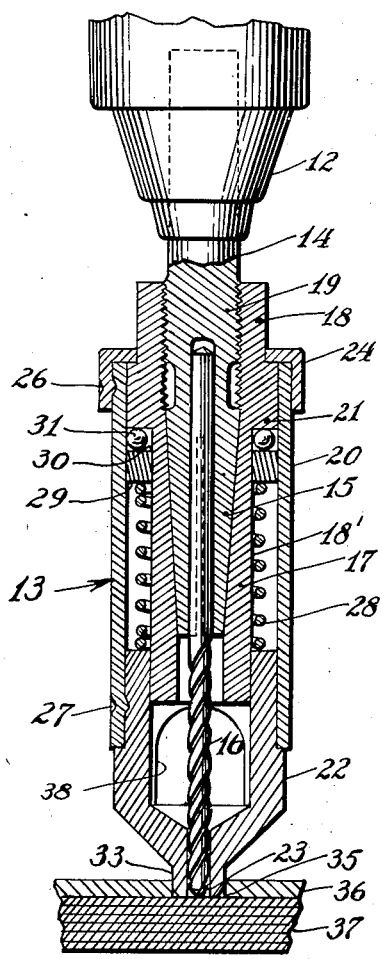
Fig. 1 is a longitudinal section through the device as associated with a portion of a drilling machine.
Figure 2:
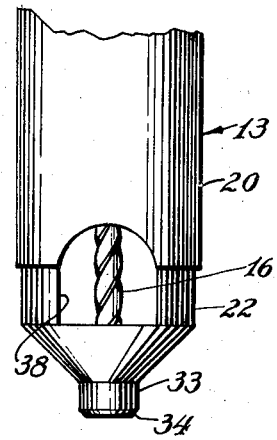
Fig. 2 is a side elevation of a portion of the device.
Figure 3:
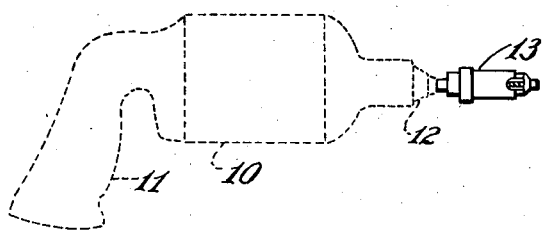
Fig. 3 is a diagrammatic elevation showing how the device is mounted in a portable drilling machine.

Referring briefly to Fig. 3, 10 represents a portable electric drill having a handle 11 and a chuck 12. In the chuck is secured a drilling device 13 whose construction is detailed in Figs. 1 and 2. It is apparent that the device 13 may be used in other forms of drilling machines than a portable electric drill, such for instance as a pneumatic drill or in any one of the numerous types of drill presses which are used in industry.

Now referring to Figs. 1 and 2, 12 again indicates the chuck of the drilling machine and in thus chuck is clamped a mandrel whose upper portion is formed as a shank 14 engageable by the chuck and whose lower portion is formed as a split auxiliary chuck or collet chuck 15 within which a drill 16 is fitted. The exterior of the collet chuck 15 is tapered and is embraced by a member 17 having a corresponding internal taper and having a nut portion 18 engageable with a threaded portion 19 of the shank 14 by which the drill is securely clamped. The lower exterior portion of the member 17 is of cylindrical form as at 18' while the upper part thereof is shouldered as at 21. Embracing the member 17 is a sleeve 20 which is fitted to the upper portion of the member 17 and is freely slidable and rotatable with respect thereto. The lower portion of the sleeve 20 is fitted with a hardened bushing 22 which is piloted for sliding and rotation on the cylindrical surface 18 of the member 17 and which is formed at its lower end with a hole 23 having running clearance with the drill 16. The assembly comprising the bushing 22 and the sleeve 20 is thus axially movable upon the member 17 and is freely rotatable with respect thereto. This assembly is limited as to downward movement with respect to the member 17 by a shouldered annulus 24 engageable with the top of the shoulder portion 21 and secured to the sleeve 20 by staking as at 26 or by other suitable means. Within the cavity formed between the sleeve 20 and the member 17 is a spring 28 which bears at its lower end upon the top of the bushing 22 and which bears at its upper end on the lower surface of a ring 29, the top surface of which forms a race 30 on which balls 31 may roll to form a thrust bearing in connection with the shoulder 21.

The lower end of the bushing 22 is externally formed with a cylindrical surface 33 and a chamfer 34 which may be readily engaged with a hole 35 formed in a template 36 overlying and clamped to, by means not shown, a stack of one or more sheet metal plates 37. The bushing 22 is formed with chip clearance holes 38 as shown in Fig. 2.

In using this device, the operator inserts the drill 16 in the assembly and then mounts the whole assembly in the drilling machine chuck 12. Thereafter, he locates the lower end of the bushing 22 in the template holes and, with the drill continually rotating, merely presses the drill into the work whereupon the bushing 22 and sleeve 20 retract along the drill as the drill progresses through the work, at all times accurately locating the drill axis in concentric relation with respect to the guide hole 35 in the template 36. The operator may grasp the sleeve 20 during the locating and drilling operation since it is mounted for free spinning with respect to the drill and drill holding elements. When the drilling machine is in operation, the sleeve and collar assembly may rotate with the drill, but since it is not driven by the drill, an operator may at any time grasp the sleeve to stop its rotation and thereupon use it for locating and guiding the drill in a drilling operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A hole drilling assembly comprising a collet element having a shank securable in a drilling machine, said collet element being bored to receive a drill, a collet nut embracing and in threaded engagement with the collet element to secure a drill therein, said nut comprising, externally, an elongated cylindrical guide having a shoulder at its upper end, a sleeve embracing the guide, freely slidable and rotatable thereon, a drill collar secured to the sleeve having a bore within which the colletted drill is slidable and rotatable, and resilient means between the sleeve and guide urging the sleeve and collar outwardly toward and over the end of the drill.

2. A drill holding and guiding assembly comprising a chuck member bored to receive a straight shank drill and having a shank for attachment to a drilling machine, a nut screw threaded upon said member, organized to secure a drill in said member, said nut, upon part of its external surface, being formed as a cylindrical guide, a sleeve embracing said nut and mounted for rotation and reciprocation relative thereto on said guide, and a drill bushing carried by said sleeve.

3. A drill holding and guiding assembly comprising a chuck member bored to receive a straight shank drill and having a shank for attachment to a drilling machine, a nut screw threaded upon said member, organized to secure a drill in said member, said nut, upon part of its external surface, being formed as a cylindrical guide, a sleeve embracing said nut and mounted for rotation and reciprocation relative thereto on said guide, a drill bushing carried by said sleeve, and resilient means between said nut and sleeve urging the latter axially toward the drill point.

4. A drill chuck and guiding assembly comprising a drill engaging member having means for attachment to a drilling machine, a barrel embracing and adjustable relative to said member for securing a drill therein, said barrel being formed externally as a cylindrical guide, a sleeve slidably and rotatably fitted to said guide, and a drill embracing bushing secured to said guide.

LEROY J. JAGOW.